United States Patent

Fishman et al.

[15] 3,645,860

[45] Feb. 29, 1972

[54] PROCESS FOR THE PREPARATION OF AN ELECTROCATALYST

[72] Inventors: Jerry Haskel Fishman, New York; Jean Francois Henry, Huntington Station; Susanne Tessore, New York, all of N.Y.

[73] Assignee: Leesona Corporation, Warwick, R.I.

[22] Filed: Mar. 4, 1969

[21] Appl. No.: 804,308

[52] U.S. Cl. ..............................204/35 R, 204/42, 204/46, 204/47, 204/56 R, 204/130
[51] Int. Cl. .........................................C23b 9/00, C23b 5/24
[58] Field of Search..................204/38, 56, 58, 42, 35, 130, 204/45.9, 46–47; 252/472

[56] References Cited

FOREIGN PATENTS OR APPLICATIONS 1,022,927  3/1966  Great Britain..........................204/58

*Primary Examiner*—Howard S. Williams
*Assistant Examiner*—R. L. Andrews
*Attorney*—Alfred W. Breiner

[57] ABSTRACT

A method for the preparation of an electrocatalyst which comprises (a) electrodepositing less than a complete monomolecular layer of material on a substrate utilizing cathodic polarization of short duration, and (b) oxidizing the electrodeposit and the substrate utilizing anodic polarization, also of short duration is described. The deposited material preferably is a metal or metal oxide having useful catalytic and/or electrical properties, e.g., platinum or gold. The substrate preferably is a metal or metal oxide such as tantalum oxide, tungsten oxide, or a sodium tungsten bronze, $Na_xWO_3$. The substrate is treated in an electrolyte containing a very dilute solution of the material to be deposited and/or in the presence of a counterelectrode containing this material. Several repetitions of these method steps, i.e., reversing the polarity such that the deposition and oxidation steps alternate, results in the complete or partial integration of minute portions of electrodeposited material in the substrate material. This method is useful for providing or improving catalytic activity in a substrate. The products produced by the method are useful in electrochemical devices.

13 Claims, No Drawings

PROCESS FOR THE PREPARATION OF AN ELECTROCATALYST

FIELD OF THE INVENTION

This invention relates to a method of electrolytically introducing into or treating a substrate with a material having desirable electrical and/or catalytic properties, e.g., a precious metal, and to the product of this method. More particularly, according to the process the substrate is alternately subjected to cathodic and anodic polarization in an electrolytic bath, i.e., the treatment medium, containing a precious metal or the like in an extremely small concentration. The alternate cathodic and anodic half-cycles, i.e., the steps of the polarization treatment are very short in duration. The result of the treatment is that minute amounts of electrodeposited material are locked in the surface or subsurface of the substrate. The resulting treated substrate has desirable catalytic and/or electrical properties and can be used as an electrochemical catalyst, a solid-state device, or the like.

DESCRIPTION OF THE PRIOR ART AND BACKGROUND

A well-known technique in the electrocatalyst art involves the use of a substrate, which may or may not have catalytic activity, as a surface or matrix for the inclusion or deposition of a material which has greater catalytic activity. Thus, it is known to plate a relatively inexpensive substrate material with a catalytically active metal such as a member of Groups VIII or I-B of the Periodic Table. In this manner a relatively small amount of the highly expensive catalytic metal can provide the same or nearly the same activity as the pure metal.

For example, normally a "loading" of 5–20 milligrams per square centimeter of a noble metal catalyst such as platinum upon an inactive or relatively inactive substrate will provide a satisfactory electrocatalyst for use in a fuel cell. Although the cost of such a catalyst is much less than a pure platinum catalyst in the electrode, a platinum loading of this magnitude can be prohibitive for many applications. The present state of the catalytic art still has not provided a solution to the economic problems presented by the use of expensive metals such as platinum as catalysts.

It is also known in the prior art to use reverse polarity techniques in electrolytic plating or coating processes. These prior art reverse polarity techniques generally involve one or more steps in which the electrolyte treatment bath contains a high concentration of a dissolved metal, metal salt or the like. The substrate thus acquires a substantial coating of the metal and/or metal oxide. If precious metals such as platinum were employed in these prior art techniques, high loadings of the type noted above result with the concurrent economic problems.

It has now been found that a relatively inexpensive material can be rendered catalytically active with minute quantities of platinum. More specifically, it has been established that the electrolytically grown sodium tungsten "bronzes" ($Na_xWO_3$ wherein $x$ varies from about 0.5 to about 1.0), possess virtually no electrocatalytic activity for oxygen reduction. Yet when a tungsten "bronze" is prepared in a platinum crucible at elevated temperatures such as 800° C., the resulting material is capable of catalyzing the electrochemical reduction of oxygen. It is theorized that tiny quantities of platinum from the surface of the crucible have somehow migrated into the surface of the tungsten bronze. The result of this migration is a material which has useful electrochemical properties. However, the above preparation is expensive, inefficient, and difficult to control and, therefore, has only limited commercial value.

OBJECTS OF THE INVENTION

Accordingly, it is an object of this invention to provide a method of making a catalyst wherein extremely small loadings of a catalytically active material will render active a substrate having little or no catalytic activity.

Another object of this invention is to provide electrocatalysts which are much less expensive than, and have activity comparable to, known electrocatalysts with 5–20 mg./cm.$^2$ loadings of a noble metal.

A further object of this invention is to provide a method for locking or depositing minute quantities of a material in the surface or subsurface of a substrate.

A further object of this invention is to provide a method for imparting electrochemical activity to an oxide or the like with trace amounts of a catalytic material which does not require the use of high temperatures and/or expensive equipment.

A still further object of this invention is to provide an electrolytic method for introducing controlled trace amounts of a catalytic material into the surface or subsurface of a substrate wherein the results are sufficiently reproducible to conform to quality control standards.

SUMMARY OF THE INVENTION

The objects of this invention are carried out by incorporating trace quantities of one material in the surface or subsurface of a second material. The method of treating the second or substrate material involves alternate anodic and cathodic polarization in an electrolytic bath comprising a very dilute solution or colloidal suspension of the material that is to be incorporated in the substrate surface or subsurface. During each cathodic polarization step, which preferably lasts well under 60 seconds, less than a complete monomolecular layer of the material in the bath is deposited on the surface of the substrate. It is difficult to ascertain the exact nature of the electrodeposit. It is believed that it is composed of isolated clusters of atoms or molecules or of isolated single atoms or molecules, the clusters being centered around structural irregularities in the substrate surface. Although the exact nature of such electrodeposits is unknown, the important features of this cathodic polarization step are (1) its short duration and (2) the extremely low concentration of the material available for electrodeposition from the electrolyte bath, resulting in a deposit of molecules or atoms which does not completely cover every part of the exposed surface of the substrate. The cathodic step is followed by an anodic oxidation of the substrate and layer of electrodeposited material. The electrolyte used during the polarization treatment and particularly during the anodic step is preferably one in which the substrate and the electrodeposited material will not easily dissolve. In such an electrolyte medium, the formation of a mixed oxide containing atoms of both the substrate and the electrodeposit is favored. This anodic polarization step is also preferably of short duration so that the effects of the preceding cathodic step (half-cycle) are not completely destroyed. However, a portion of the electrodeposited material will be oxidized and tend to form a mixed oxide with the substrate material. The cathodic and anodic steps are alternated for a period of time ranging from several minutes to several hours, and during this period of alternating reduction and oxidation a complete or partial integration of the isolated, electrodeposited atoms, molecules, or clusters of atoms or molecules within the substrate material can be obtained. The result is an electrodeposite which is locked in the surface or the subsurface of the substrate, which possesses unusual properties as compared to a conventional electrodeposited layer, and which substantially alters the electrochemical characteristics of the substrate. For example, when the method of this invention is applied to a sodium tungsten "bronze" in an aqueous chloroplatinic acid bath and/or in the presence of a platinum counterelectrode, the resulting treated substrate, unlike the "-bronze" per se, is a good electrocatalyst. On the other hand, the platinum electrodeposit, which is present in trace quantities and is extremely difficult to detect, lacks many of the properties of the bulk metal. By "bulk metal" is meant thin plates and/or layers, and particulate metal as well as bulk solids all of which are clearly identifiable using that metal X-ray diffraction, etc. In this disclosure, the term "trace quantities" is used to denote a proportion of a material in another material which is detectable in the final sample only by highly sensitive, generally destructive analytical techniques such as emission spectroscopy.

The treated substrates of this invention are effective catalysts, and are useful in, inter alia, the electrochemical arts. For example they may be adapted to serve as fuel or oxidant electrodes in electrochemical cells such as fuel cells, and metal/air batteries. The method of this invention also has application in treating semiconductor crystals to produce materials having solid-state properties which are useful in the electronic arts.

DETAILED DESCRIPTION AND EXAMPLES

The person skilled in the art will appreciate that various substrates are suitable for use in this invention. The preferred substrates are oxides or mixed oxides of various metals. These oxides can be further mixed or compounded with unoxidized metal. Examples of suitable metal oxides are the oxides of tungsten, tantalum, nickel, and cobalt. Nickel oxide itself, unlike tantalum oxide, has some catalytic activity. The activity is greatly enhanced by the method of this invention. The preferred mixed oxide systems can be either stoichiometric or nonstoichiometric. Examples of nonstoichiometric systems are the alkali metal bronzes of tungsten and vanadium, e.g., sodium tungsten bronze, $Na_xWO_3$, wherein $x$ varies from about 0.5 to about 1.0. Conductive oxides of tungsten can also be prepared without the inclusion of alkali metals. These can be used as the substrate.

Other mixed oxides of interest are the spinels, $M^{II}M_2^{III}O_4$, $M^{III}(M^{II}M^{III})O_4$, $M^{IV}M_2^{II}O_4$, $M^{VI}M_2^{I}O_4$, and the like wherein $M^I$ indicates a monovalent metallic element, $M^{II}$ indicates a bivalent metallic element, etc. Among the elements which can be present in these spinels are zinc, manganese, iron, nickel, cobalt, aluminum, cadmium, chromium, gallium, and the like. The preferred spinel contains cobalt and nickel. Mixed oxide systems can contain lithium (lithiated nickel oxide is particularly suitable), molybdenum oxide, and other materials used in the prior art substrates. Other suitable substrate systems can employ oxides and mixed oxides or iron, cadmium, niobium, thorium, tin, lead, zirconium, indium, thalium, titanium, germanium, and bismuth.

The principal requirement of the oxide substrate is that it be insoluble or sparingly soluble in one or more electrolyte media, e.g., aqueous solutions of acid or bases, and fused salt baths. It is desirable that the oxide be easily derived from the corresponding metal and/or another oxide. In the case of tungsten, for example, all oxides below +6 state are electrically conductive and they are easily converted to the +6 oxide. These oxides are not easily attacked by phosphoric acid and therefore can be treated in a phosphoric acid bath. In the case of an oxide such as nickel oxide, which is attacked slowly by acid, an acid bath could also be used for the treatment medium, provided the treatment is not unnecessarily prolonged. After this treatment is finished, the resultant activated nickel oxide can be used in any electrolytic medium or electrolyte which does not attack it, e.g., an aqueous solution of an alkali metal hydroxide. Alternatively, the treatment or activation can be performed in an alkaline medium.

It is also possible to use a metal such as gold or the like, which does not form a stable oxide under mild anodic conditions, as the substrate. In the case of a gold substrate, the electrodeposited material, e.g., platinum, is apparently integrated into the gold latice in the form of individual atoms or clusters of atoms. Pure gold, of course, has some catalytic activity, but gold treated according to this invention with a dilute solution of chloroplatinic acid or the like is superior to pure gold, particularly in its ability to catalyze the reduction of oxygen.

The electrolytic treatment medium used in this invention is preferably an acidic or basic aqueous solution of the material to be deposited. The material to be deposited is present in the treatment medium in a very small concentration, e.g., less than $10^{-5}$ molar. The treatment medium is preferably aqueous. The concentration of metal-containing ion or the like, i.e., the material to be deposited, can range from $10^{-8}$ to $10^{-2}$ molar. The upper limit of concentration is below the most dilute solutions generally used in the art of electroplating noble metals. However, more concentrated solutions can be used if extremely short pulses are employed in the polarization to only deposit minute quantities of metal.

The material to be deposited is preferably a metal having catalytic activity. The most desirable of these metals are the members of Group VIII and I-B of the Periodic Table. Of the Group VIII metals, the best results have been obtained with platinum and palladium. Of the Group I-B metals, the best results have been obtained with gold and silver. These metals can be deposited from solutions containing any of the salts normally used in the electroplating arts such as alkali metal haloplatinates, gold cyanides, silver cyanides, and the like.

Alternatively, the extremely dilute solutions of platinum, gold and the like used in this invention can be provided by means of a corroding counterelectrode. Even precious metal counterelectrodes of platinum, gold, palladium, and silver are electrochemically corroded in various electrolyte media so as to introduce trace amounts of the corresponding metal ion into the electrolyte. Small amounts of electrolyte additives such as chloride ion, vanadium phosphate and various salts known in the art can be used to accelerate the corrosion. For example, a gold counterelectrode in a phosphoric acid bath is more rapidly corroded by the method of this invention in the presence of nickel, and/or iron chlorides.

All available experimental data indicate that substrate materials treated with metals or the like in accordance with this invention take on properties not characteristic of either the substrate or the metal per se. It has already been noted that substrates used in the method of this invention may completely lack electrochemical activity before treatment yet exhibit such activity after treatment. Insofar as the electrodeposited metal is concerned, the evidence points to the conclusion that the electrodeposit is in or below the surface of the substrate in trace quantities, and that these trace quantities do not have the characteristics of bulk metal. Electrochemical scans of the treated substrate do not reveal anodic and cathodic peaks which would be expected if the metal were present in its bulk form, nor can the presence of the metal be detected by various techniques involving the use of the electron microprobe and X-rays. A spectroscopic analysis does show the metal to be present in an amount estimated to be a small fraction of 1 percent. An example of the unique properties of these trace quantities of metal is the nature of the electrochemical activity imparted to a tungsten "bronze" substrate by gold. The electrocatalyst activity of such a treated substrate (measured in terms of cathodic currents produced by the reduction of oxygen) is comparable to that of platinum. Yet bulk gold is a very poor oxygen reduction catalyst, particularly when compared to platinum in acid electrolyte.

The substrate materials treated according to this invention can be in several different forms. Rods, sheets, and powders, are suitable, as are large, carefully "grown" crystals. If the substrate is only marginally electrically conductive, the effectiveness of treatment may be increased by suitable methods commonly used in the art. For example, it may be placed in contact with a porous or foraminous conductive element such as a segment of metal screen, gauze, mesh, or expanded metal.

Another commonly used technique is to mix the poorly conductive material in finely divided form with a particulate metal or graphite. Some of the substrate materials contemplated for the use in this invention are electrically conductive during the cathodic and/or anodic steps or half-cycles of the treatment, and for these materials rather simple electrical contact means will generally suffice. A counterelectrode comprising graphite or the metal to be electrodeposited can be used for the opposite polarity. Alternatively, a second substrate can be used as the counterelectrode. This arrangement will permit simultaneous reverse polarity treatment of two substrates. The treated substrates can be made into electrochemical cell electrodes by various methods known in the art.

The cathodic and anodic portions of a complete cycle of polarization treatment carried out in accordance with this invention have been referred to as "half-cycles" or as "steps" of the complete treatment. The use of the term "half-cycle" is not intended to imply that the cathodic and anodic portions of a cycle of polarization must be symmetrical. In fact, the two "halves" of the cycle need not be equal in duration, voltage, or current density. Even if the two "halves" are identical except for polarity; various durations, voltages, and current densities can be employed with regard to the polarization cycle as a whole. The number of cycles will vary depending upon the nature of the substrate and the electrodeposited material, but generally speaking as few as five complete cycles or 3 minutes of treatment will provide measurable results. Up to 24 hours of treatment can be used to good purpose, but as a general rule 0.5–5 hours treatment produces good results. In the case of a corroding gold electrode in a phosphoric acid electrolyte containing chloride ion, treatment lasting more than 5 hours can produce inferior results as compared to shorter treatments.

The length of an anodic or cathodic half-cycle is, as has been pointed out, preferably less than 60 seconds. However, the cathodic half-cycle or step can last for 300 seconds. The anodic half-cycle or step can be as long as 300 seconds in duration. The half-cycle duration will ultimately depend on the nature of the substrate, concentration of the treatment solution and kinetics of the processes. Neither step should be substantially less than 0.1 seconds. The applied potential can be, during either the cathodic or anodic half-cycle, from 20 to 1 volts. From 1.5 to 3 volts is preferred. Current densities will depend on the resistance of the system.

The significant limiting factor in the duration of the cathodic half-cycle is that less than a complete monomolecular layer of metal or the like is deposited on the surface of the substrate that is exposed to the electrolyte.

The most significant factor limiting the duration of the anodic half-cycle is the effect that anodic polarization can have on the substrate/electrodeposit system built up during the cathodic half-cycle. An unduly prolonged anodic half-cycle can completely destroy the electrodeposit or bury it too deeply in a layer of oxidized substrate. A partial modification or destruction of the system built up during cathodic treatment may be unavoidable, but the destructive effects should be minimized. Generally speaking, the anodic half-cycle should only be long enough to build up a very thin oxidized layer on the treated surface.

The following examples illustrate the principle and application of this invention without limiting its scope. In these examples and throughout this specification all percentages are by weight unless otherwise indicated.

EXAMPLE I

A. Activating Tungsten "Bronze" With Platinum

An electrolytically grown crystal (0.5 cm.$^2$ surface area) of sodium tungsten bronze, $Na_{0.73}WO_3$ was attached to a gold wire. The "bronze" substrate was positioned in a rectangular treatment vessel such that the gold wire was not in contact with the electrolyte, which was a 50 weight percent aqueous solution of phosphoric acid containing $10^{-7}$ weight percent chloroplatinic acid (roughly $2.4 \times 10^{-9}$M with respect to platinum). The counterelectrode was a platinum screen cylinder 6 cm. in diameter, surrounding the bronze. The treatment of the substrate considered of alternate cathodic and anodic polarizations where each polarity was held 20 seconds under a 3-volt applied potential. The treatment was carried out at room temperature and lasted 1.5 hours. The treated substrate prepared by the method of this part of this example will hereinafter be referred to as Sample 1-a. For purposes of comparison, the following samples, designated 1-b, 1-c, and 1-d were prepared.

Sample 1-b consisted of an untreated electrolytically grown sodium tungsten bronze crystal completely free of even trace quantities of platinum. The preparation of tungsten bronzes is described in "Electrical Properties of Tungsten Bronzes," by H. R. Shanks, P. H. Siolles, and G. C. Danielson, *Advances in Chemistry Series;* and "Electrical Resistivity of Cubic Sodium Tungsten Bronze" by L. D. Ellerbeck, H. R. Shanks, P. H. Siolles, and G. C. Danielson, *J. Chem. Phys.*, 35, 298, 1961.

Sample 1-c consists of a tungsten bronze identical to that of Samples 1-a and 1-b except that it was plated with platinum for 0.75 hours in 50 percent aqueous phosphoric acid containing $10^{-7}$ weight percent chloroplatinic acid. In other words, this sample was treated with the electrolyte medium used in the case of Sample 1-a, but instead of reversing the polarity, a constant cathodic polarity was held for the entire 0.75 hours under a 3-volt applied potential.

Sample 1-d was prepared from sodium tungsten bronze in the same manner as Sample 1-a except that the electrolyte contained a high concentration of chloroplatinic acid, more specifically, enough to make up a 2 weight percent solution. All treated samples, i.e., Samples 1-a, 1-c, and 1-d, were subjected to a 3-volt potential.

B. Analysis of Treated "Bronzes"

Samples 1-a–1-d were analyzed for platinum content by means of (1) potential scans, (2) X-ray diffraction studies, (3) examination by electron microprobe, and (4) examination of emission spectra. The results for the reference samples will be considered first.

Sample 1-b

1. A potential scan was conducted in an argon-purged 10 weight percent aqueous phosphoric acid electrolyte at room temperature. The sample was scanned from 0.0 volts to 2.0 volts and back to 0.0 volts at the rate of 200 millivolts per minute. All potentials are expressed with respect to a hydrogen reference in the scan system. At 0.0 volts the electrode supported a cathodic current due to hydrogen evolution. This current diminished to zero as the potential increased to about 50 millivolts. The current became anodic on increase of potential beyond 50 millivolts, reached a maximum at about 300 millivolts and subsided to virtually zero at about 700 mv. This anodic current is due to the anodic oxidation of the bronze surface. The current remains zero on continued increase of potential to 2.0 volts. The current continues to be zero on decreasing the potential from 2.0 volts to 700 mv. Below 700 mv., the tungsten bronze supports a pronounced cathodic current associated with surface oxide reduction. The current includes the hydrogen evolution process at potentials near 0.0 volts. The same pattern of anodic and cathodic currents was observed with a potential scan of Sample 1-b in an oxygen-saturated 10 percent phosphoric acid medium. Both scans were conducted at room temperature at 200 mv. per minute.

2. Studies by X-ray diffraction did not reveal any indication of the presence of platinum.

3. Electron microprobe studies did not indicate the presence of platinum.

4. The emission spectrum of Sample 1-b did not contain lines for platinum.

Sample 1-c

1. A potential scan in argon-purged and oxygen-saturated media was carried out following the procedure for Sample 1-b. In the argon-purged electrolyte, anodic peaks were observed at 300 mv., 1,200 mv., and approximately 2,000 mv. The 1,200 mv. peak is quite large and corresponds to the region in which platinum is oxidized. The anodic current at 2,000 mv. is due to oxygen evolution. On decreasing the potential from 2,000 mv., a cathodic peak typical of platinum oxide reduction was observed at about 750 mv. At about 100 mv., another cathodic current principally associated with hydrogen evolution was initiated. The anodic peak at 300 mv. is due to the oxidation of the substrate material and/or hydrogen oxidation.

In the oxygen saturated system, strong cathodic currents were observed at 0–850 and 900–0 mv. In these regions, the reduction of oxygen was apparently taking place. Thus, both scans indicated the presence of platinum.
2. X-ray studies showed the presence of platinum.
3. Electron microprobes showed the presence of platinum.
4. Both tungsten and platinum lines appeared in the emission spectrum of the sample.

Sample 1-$d$

The results of the potential scan analysis of this sample were similar to Sample 1-$c$. The emission spectrum revealed the presence of platinum lines, and there was X-ray evidence of platinum in the sample.

Sample 1-$a$
1. The method of carrying out potential scans used above was also used with this sample. The argon-purged system showed a pattern of cathodic and anodic current virtually identical to that of Sample 1-$b$, which was the pure sodium tungsten bronze sample. In the oxygen-saturated system, the anodic 300 mv. peak was missing because in the 0.0–800 mv. region, the current was actually cathodic and was apparently caused by reduction of oxygen. When the scan passed through 2,000 mv. and returned to about 600–500 mv., a strong cathodic current was produced which intensified as the scan was completed. In short, Sample 1-$a$ appeared to possess neither the characteristics of platinum (i.e., anodic peak at 1,200, cathodic peak at 750 mv.), nor the lack of catalytic activity characteristic of pure tungsten bronze.
2. The X-ray studies did not reveal any of the diffraction effects normally produced by platinum.
3. Electron microprobe studies also failed to indicate the presence of platinum.
4. The spectrum of Sample 1-$a$ contained both the platinum and tungsten lines. The platinum content was estimated to be at the level of about 0.07 percent by weight.

To further confirm the analytical findings, rapid potential scans were performed on Samples 1-$a$ through 1-$d$ and a bright platinum sample. The scans were performed at 1 volt per second, 10 volts per second, 100 volts per second, and 1,000 volts per second. The scan range was 50–1,650–50 mv. The electrolyte medium was argon-purged 10 percent phosphoric acid, and scans were conducted at room temperature. The potential versus current traces of Samples 1-$a$ and 1-$b$ were very similar. It is believed that the slight differences in the Sample 1-$a$ and 1-$b$ traces conducted at the same rate of voltage change are merely due to surface size and differences. The traces of Samples 1-$c$ and 1-$d$, however, were completely different from those of Samples 1-$a$ and 1-$b$ and bore some resemblance to the bright platinum scans. In fact, Sample 1-$c$ had essentially the same scan characteristics as bright platinum. From this evidence it is concluded that, although the platinum lines are present in the spectrum of Sample 1-$a$, sodium tungsten bronze treated according to this invention does not have the characteristics of a "bronze" with platinum electroplated on the surface. On the contrary, a "bronze" treated with a reverse polarity technique in a dilute solution of platinum ion has unique characteristics not possessed by either platinum or tungsten bronze.

Structures as defined in Samples 1-$a$, 1-$b$, 1-$c$, and 1-$d$ were tested as oxygen electrodes versus a standard hydrogen reference electrode. Sample 1-$b$, which was the untreated tungsten bronze, would not support a current. Samples 1-$c$ and 1-$d$ gave polarization curves similar to that of pure platinum. Sample 1-$a$ provided a polarization curve substantially similar to that of platinum even though it was impossible to detect platinum in the structure other than by destructive techniques.

EXAMPLE II

Sodium tungsten bronze Na$_x$WO$_3$ ($x$—0.65) was grown from a melt of NaWO$_x$, WO$_3$ on a gold mesh employing a gold counterelectrode. The resultant crystals were mortared or ground up, sieved through a 325 mesh screen, and thereafter admixed with a polytetrafluoroethylene aqueous dispersion at a weight ratio of 10:1. The admixture was applied to a 5 cm.$^2$ stainless steel screen. The loading of the catalyst/polytetrafluoroethylene was 30 mg. tungsten bronze per square centimeter. The structure was placed in a bath containing 400 milliliters 50 weight percent phosphoric acid containing 10$^{-7}$ weight percent platinum as chloroplatinic acid. A 10 cm.$^2$ platinum mesh counterelectrode was placed in the bath 3 centimeters away and parallel to the tungsten bronze electrode. A 3-volt potential with the polarity being reversed every 20 seconds was applied for a period of 6 hours. The electrode was removed from the solution, thoroughly washed with distilled water and a porous Teflon film was placed on its surface which was away from the counterelectrode during ,reatment. The structure was mounted in an electrode holder, contacted with 50 percent phosphoric acid electrolyte at 70° C. and tested as an oxygen cathode. The oxygen was fed to the electrode through the porous Teflon film. The current characteristics are as follows:

| Current Density ma./cm.$^2$ | Potential mv. |
|---|---|
| OCV | 980 |
| 50 | 910 |
| 100 | 885 |
| 150 | 870 |

All potentials are with respect to a hydrogen reference in the same system. The tungsten bronze prior to treatment failed to support a current.

EXAMPLE III

Nickel powder sieved through a 325 mesh screen was admixed with a polytetrafluoroethylene aqueous dispersion at a weight ratio of 10:3 and bonded to a 5 cm. nickel screen. The loading of nickel was 30 mg./cm.$^2$. The structure was placed in 400 milliliters of 10 weight percent phosphoric acid containing 10$^{-7}$ weight percent platinum as chloroplatinic acid. A 10 cm. platinum screen counterelectrode was placed in the same bath 3 cm. away from the nickel electrode and parallel thereto. A potential from a 6-volt source was applied to the system reversing the polarity every 20 seconds for a period of four hours. The structure was removed from the solution, thoroughly washed in distilled water and a porous polytetrafluoroethylene film was placed at the surface away from the counterelectrode during treatment. The electrode was mounted in an electrode holder and tested in 5N potassium hydroxide at 40° C. as an oxygen cathode, the gas being fed to the polytetrafluoroethylene film of the electrode. Current characteristics were obtained as follows:

| Current Density ma./cm.$^2$ | Potential mv. |
|---|---|
| OCV | 1.075 |
| 50 | 950 |
| 100 | 935 |
| 150 | 928 |

EXAMPLE IV

Example 2 was repeated, except in this instance a potential of 2.5 volts was applied for a period of 1 hour. The current characteristics are as follows:

| Current Density ma./cm.$^2$ | Potential mv. |
|---|---|
| OCV | 900 |
| 50 | 860 |
| 100 | 855 |

EXAMPLE V

Tantalum metal powder was sieved through a 325 mesh screen and admixed with a polytetrafluoroethylene aqueous dispersion at a 10 : 3 weight ratio. The admixture was applied to a 5 cm.$^2$ stainless steel mesh at a loading of 50 mg./cm.$^2$ of tantalum. The resultant structure was placed in an electrolytic bath comprising 10 weight percent phosphoric acid containing $10^{-7}$ weight percent gold as the gold chloride. A gold foil counterelectrode was inserted in the same bath having a 5 cm.$^2$ surface area and being parallel to and 3 cm. away from the tantalum electrode. A potential of 2.5 volts was applied to the system reversing the polarity every 20 seconds for one hour. The structure was washed, backed with a PTFE film, and tested as in Example II to provide the following results:

| Current Density ma./cm.$^2$ | Potential mv. |
| --- | --- |
| OCV | 886 |
| 50 | 800 |
| 100 | 792 |
| 150 | 788 |

In a similar system gold does not support any appreciable current until 600 mv.

EXAMPLE VI

Two electrode structures were prepared as in Example V and thereafter treated in a 10 weight percent phosphoric acid electrolyte bath containing $2\times10^{-7}$ weight percent palladium as palladium chloride, and $10^{-7}$ weight percent gold as gold chloride. The two electrodes were spaced 3 cm. apart and a potential applied from a 4 v. source for 4 hours reversing the polarity every 20 seconds. After washing and backing the electrodes with a polytetrafluoroethylene film, they were tested as hydrogen anodes in a 50 percent phosphoric acid electrolyte at 70° C. The electrodes were fed with a mixture of 75 percent hydrogen, 24.8 percent carbon dioxide, and 0.2 percent carbon monoxide to provide the following results:

| Current Density ma./cm.$^2$ | Potential (mv.) Electrode A | Potential (mv.) Electrode B |
| --- | --- | --- |
| OCV | 0.005 v. | 0.001 v. |
| 50 | 10 | 12 |
| 100 | 13 | 15 |
| 150 | 15 | 16 |

The person skilled in the art will appreciate that various modifications of this invention may be made without departing from the scope thereof which is to be determined from the following claims.

What is claimed is:

1. An electrochemical method of improving the electrocatalytic properties of a substrate comprises the steps:
   a. electrodepositing from an electrolyte a trace quantity of catalytically active material onto said substrate by cathodically polarizing said substrate for a short time, which is effective in only partially covering the surface of said substrate with said catalytically active material, said substrate comprising a substance taken from the group consisting of metals, oxides of metals, and combinations thereof;
   b. oxidizing the electrodeposited material by anodically polarizing said substrate and electrodeposited material for a short time which is insufficient to completely remove said cathodic deposit; and
   integrating the electrodeposited material into the substrate structure by repeating steps (a) and (b).

2. A method according to claim 1 wherein said material to be deposited is provided in the electrolyte in dilute solution.

3. A method according to claim 2 wherein the concentration of the material to be deposited is less than 0.1 molar.

4. A method according to claim 1 in which the substrate material is insoluble or sparingly soluble in the electrolyte medium.

5. A method according to claim 4 in which the electrolyte medium is an aqueous solution of an acid and the substrate material is selected from the group consisting of a sodium tungsten bronze, a cobalt-nickel spinel, and an oxide of a metal selected from the group consisting of tungsten, tantalum, cobalt, and nickel.

6. A method according to claim 1 in which the electrodeposited material is selected from the group consisting of platinum, palladium, gold, and silver.

7. A method according to claim 6 wherein the substrate is a sodium tungsten bronze and the material to be electrodeposited is platinum.

8. A method according to claim 1 in which the duration of each of steps (a) and (b) is from 0.1 second to 300 seconds.

9. A method according to claim 1 in which steps (a) and (b) are repeated alternatively for a period of time ranging from 3 minutes to 24 hours.

10. A method according to claim 1 in which the electrolyte medium containing the material to be electrodeposited is an aqueous solution.

11. A method according to claim 1 in which the electrolyte medium containing the material to be electrodeposited is an acid, base or salt supporting electrolyte solution.

12. A method according to claim 1 in which the solution of material to be electrodeposited from the electrolyte medium is obtained by means of electrochemical corrosion of a counterelectrode.

13. A method according to claim 1 in which each of steps (a) and (b) lasts from 15 to 20 seconds under an applied potential of 1.0–20 volts, and the total duration of treatment is from 0.5–5 hours.

* * * * *

UNITED STATES PATENT OFFICE
CERTIFICATE OF CORRECTION

Patent No. 3,645,860    Dated February 29, 1972

Inventor(s) Jerry Haskel FISHMAN ET AL.

It is certified that error appears in the above-identified patent and that said Letters Patent are hereby corrected as shown below:

Column 2, lines 60 - 61, "electrodeposite" should read -- electro-deposit --. Column 5, line 68, "considered" should read --consisted --.
Column 10, line 16, claim 1, before "integrating" insert -- c. --

Signed and sealed this 19th day of February 1974.

(SEAL)
Attest:

EDWARD M. FLETCHER, JR.
Attesting Officer

C. MARSHALL DANN
Commissioner of Patents